April 17, 1934.　　　　G. L. DIMMICK　　　　1,955,378
ELECTRIC SOUND RECORDING
Filed Aug. 6, 1931　　　　2 Sheets-Sheet 1

INVENTOR
GLENN L. DIMMICK
BY
ATTORNEY

April 17, 1934.  G. L. DIMMICK  1,955,378
ELECTRIC SOUND RECORDING
Filed Aug. 6, 1931  2 Sheets-Sheet 2
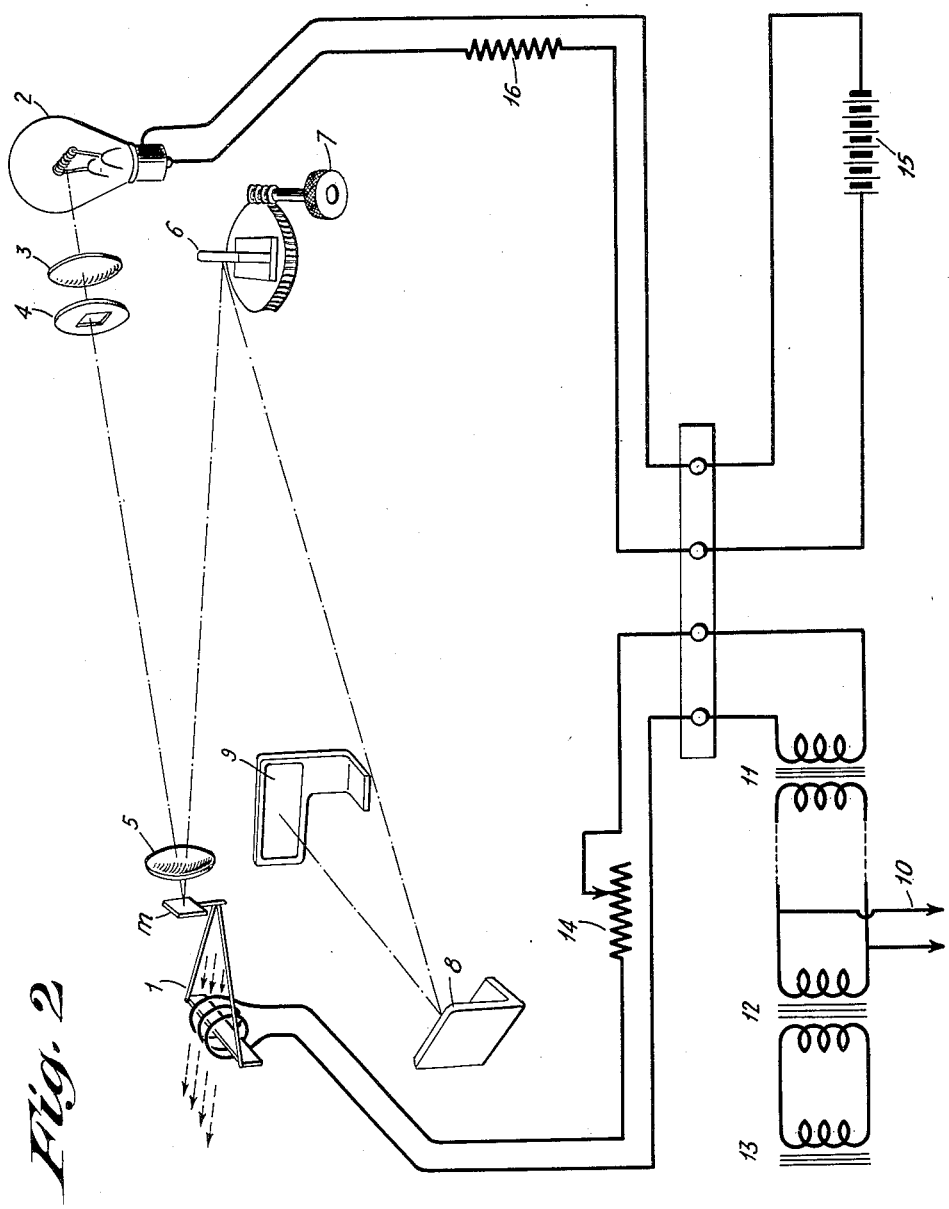
INVENTOR
GLENN L. DIMMICK
BY *H. G. Grover*
ATTORNEY Patented Apr. 17, 1934

1,955,378

UNITED STATES PATENT OFFICE 1,955,378

ELECTRIC SOUND RECORDING

Glenn L. Dimmick, Westmont, N. J., assignor to Radio Corporation of America, a corporation of Delaware Application August 6, 1931, Serial No. 555,511

5 Claims. (Cl. 179—100.3)

This invention relates to electric sound recording apparatus and more particularly to apparatus for indicating volume or amplitude of such recording.

In the electrical recording of sound, it is customary to pick up the sound by a microphone, then amplify it through an appropriate multistage amplifying system, and then impress it upon a recording medium by an appropriate mechanism such, for example, as a galvanometer or shutter in variable area sound recording, by a light valve of either the mechanical or piezo-electric variety or by a glow lamp in variable density sound recording, and by a magnetically operated cutter in recording upon wax discs or equivalent media.

In all such recording, it is necessary to properly control the operation of its recording member or mechanism, and in order to properly control the operation it is essential that the operator first know the conditions actually existing in the circuit relative to response of the recording mechanism; "recording mechanism" being herein used in the sense of the instrumentality which impresses the variations in the electrical current coming from the amplifier upon the record medium.

Heretofore many means have been used in attempting to determine the operating condition of such circuit, said means consisting of, for example, ear-phones or loudspeakers which depend upon the judgment of the operator for determination of amplitude or intensity, rectifiers with D. C. milliammeters, thermo-galvanometers, etc. Recordists have also attempted to control the operation of the recorder by watching the operation of the recording member directly through an appropriate viewing apparatus such as a magnifier or microscope.

All of these methods have been more or less unsatisfactory as the audible method is subject to the physical and psychological limitation of the human ear causing variations of sometimes 100%, the thermo-galvanometer is relatively sluggish and cannot follow sudden changes in amplitude or extreme amplitudes of a single frequency in a group of mixed frequencies, and the rectifier, galvanometer or milliammeter is more or less erratic with frequency, losing almost its entire sensitivity at high frequencies due to the inherent capacity of the rectifier.

The present invention relates to a new method of and apparatus for monitoring such sound recording through the provision of an indicator having operational characteristics substantially identical with those of the recording mechanism itself.

One object of the invention is to provide an indicator of the galvanometer type having substantially identical characteristics with those of the galvanometer ordinarily used in variable area sound recording.

Another object of the invention is to provide such a galvanometer of variable characteristics in order that it may be properly matched with such recording mechanism as may be in use.

Another object of the invention is to combine with an electrical recording system an indicating mechanism having amplitude and frequency characteristics which are at all times proportional to those of the recording mechanism itself.

Another object of the invention is to provide such an indicating mechanism having limiting indications corresponding exactly to the permissible limits of amplitude in recording at all frequencies in order that "overshooting" may at all times be prevented.

Another object of the invention is to provide an indicating mechanism which may be used remote from the recorder itself.

Another object of the invention is to provide means permitting the location of the recorders at any most appropriate place chosen, for example, for freedom from vibration, electrical interference, or light, and at the same time permit the recordist to have a complete knowledge of the exact performance of such recorders.

Another object of the invention is to provide indicating means operable at considerable distance from the recording mechanism and thereby permitting the location of such indicator together with the control mechanism for the circuits directly on the recording stage.

Another object of the invention is to provide such an apparatus which is relatively compact and rugged and at the same time has a very high sensitivity.

Another object of the invention is to provide such an apparatus which requires no modification of the existing recording apparatus being merely attached to the same circuit therewith.

Another object of the invention is to provide such an indicating device which is clearly visible from an appreciable distance, thereby avoiding any necessity for the operator keeping his eye close to a microscope or other eye-piece.

Another object of the invention is to provide such an apparatus which is readily adjustable to coincide with zero point with the recording mechanism.

In the drawings;

Fig. 2 is a diagrammatic illustration showing the construction and electrical connections of the device.

Figure 1B:
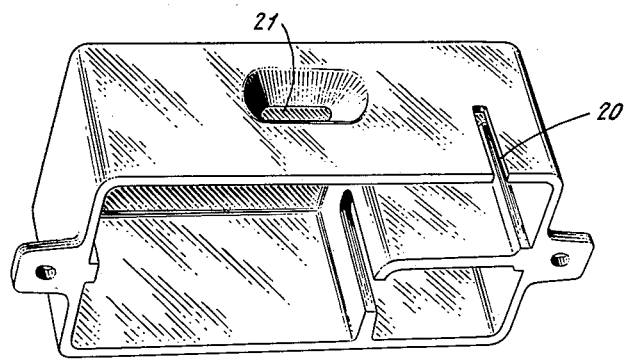
Figs. 1A and 1B show the device as constructed, Fig. 1B showing the cover removed from the base and the mechanism which are shown in Fig. 1A.
Figure 1A:
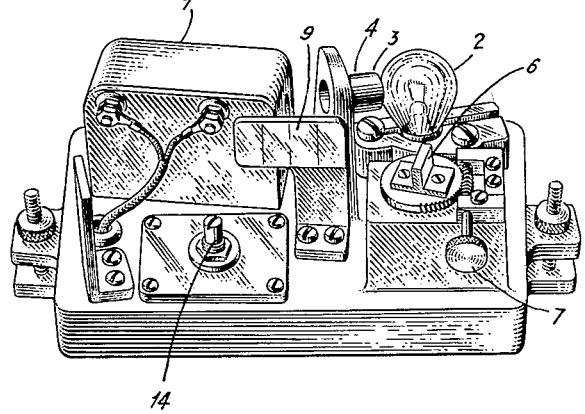

Referring first to Fig. 2:

The apparatus itself consists of a reflecting galvanometer indicated at 1 and including the usual mirror M. Light from the exciter lamp 2 is focused by the lens 3 upon the rectangular aperture 4 whence it passes to the lens 5 which serves to condense the beam on to the mirror M. From this mirror the light again passes through the lens 5 to the adjustable mirror 6 which is rotatable about its vertical axis by the adjusting means 7 so as to reflect the beam on to mirror 8 and from thence to the midpoint of the target 9.

It will be noticed that the mirrors 6 and 8 provide a very long optical path within the relatively small dimensions of the apparatus and it will be further noted that the beam strikes the viewing screen 9 at a very slight angle, whence a very slight deflection of the beam will cause a relatively large movement thereof along the screen.

The output from the amplifier is transmitted through the line 10 to the transformers 11 and 12. The transformer 12 feeds the recording mechanism indicated diagrammatically at 13 and the similar transformer 11 actuates the galvanometer of the indicator. In series with the transformer and galvanometer is a variable resistor 14 which serves to vary the sensitivity of the indicator to match that of the recording mechanism.

The galvanometer 1 is so designed as to have electrical and mechanical characteristics substantially identical with those of the recording mechanism 13, and the resistor 14 is used only to secure an exact adjustment of the indicator to the specific recording mechanism in use.

The exciter lamp 2 is supplied with current from the battery 15 through a resistor 16 although, of course, any other appropriate source of current supply may be used.

The cover for the apparatus, shown in Fig. 1B, is provided internally with a shield for the light to prevent stray light in undesirable portions of the case, and is also provided with an aperture 20 for the adjusting member 7 and with an observation port 21 through which the movement of the light beam over the scale 9 can be observed.

The rotating mirror 7 is so adjusted, with the current turned on and with no modulation, that the spot of light falls centrally upon the screen 9 and upon the middle index line of the scale on that screen, the recorder being likewise adjusted. The sensitivity of the device having been adjusted to correspond with that of the recorder, when modulation is impressed upon the amplifying current thereby causing functioning of the recording mechanism the spot of light will move back and forth along the screen in the same manner that the recording member moves in the recording mechanism, and any tendency to produce too great a deflection will be indicated by the approach of the spot of light toward the ends of the scale upon the screen.

I claim:

1. In combination with an electrical sound recording apparatus including an oscillograph and a source of modulated current for the operation thereof, an oscilloscope operated from the same source of current as the oscillograph and having electrical and mechanical characteristics substantially identical with those of the said oscillograph.

2. In combination in photophonographic apparatus, a recording galvanometer of the oscillograph type and an indicating galvanometer of the oscilloscope type connected in the same circuit therewith and having similar electrical and mechanical characteristics, whereby the operation of the oscillograph is indicated directly by the oscilloscope.

3. In combination in photophonographic apparatus, a recording oscillograph galvanometer and an indicating oscilloscope galvanometer of similar electrical and mechanical characteristics, and means for adjusting the indicating galvanometer to the same zero position as the recording galvanometer.

4. A vibration-amplitude indicating apparatus comprising a source of light, a reflecting galvanometer and a scale, and a plurality of mirrors between said galvanometer and said scale for increasing the effective optical path therebetween.

5. A vibration-amplitude indicating apparatus comprising a source of light, a reflecting galvanometer and a scale, a plurality of mirrors between said galvanometer and said scale for increasing the effective optical path therebetween, and means for adjusting one of said mirrors.

GLENN L. DIMMICK.